Dec. 20, 1927.
C. N. KOCH
1,653,217
COMBUSTION TURBINE
Filed Feb. 3, 1923      6 Sheets-Sheet 2
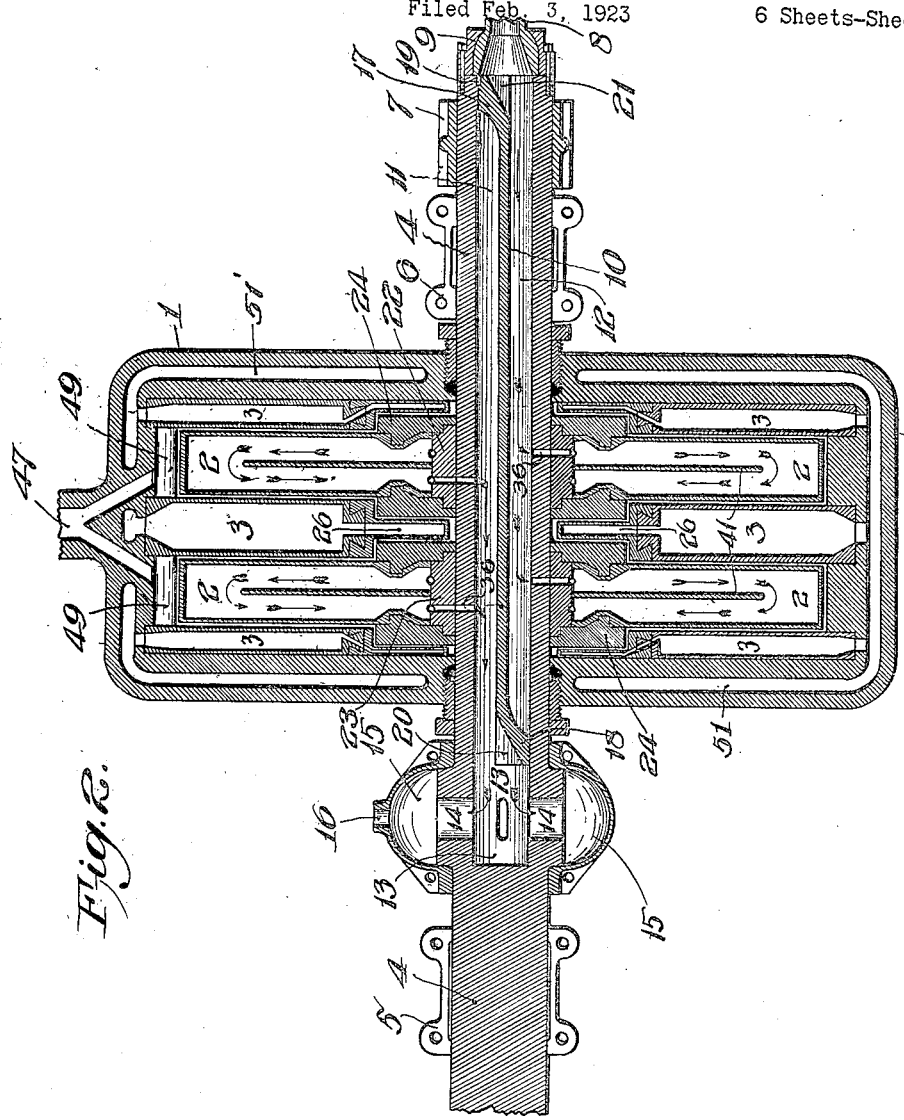
Inventor
Charles N. Koch.
By Shedersheim Fairbanks
Attorney Dec. 20, 1927. 1,653,217
C. N. KOCH
COMBUSTION TURBINE
Filed Feb. 3, 1923 6 Sheets-Sheet 3
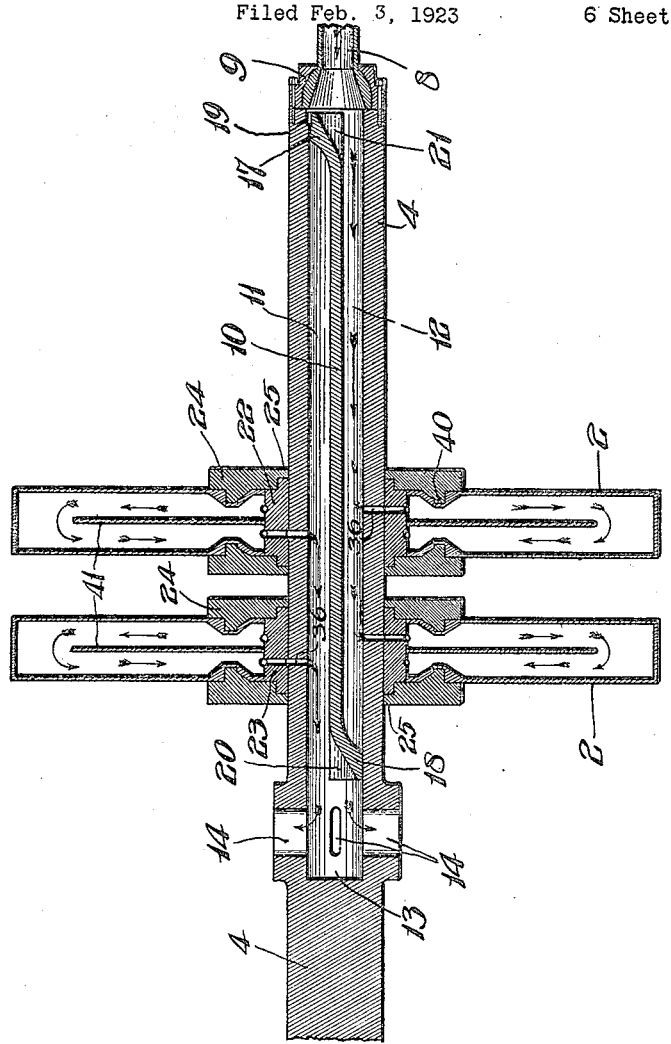
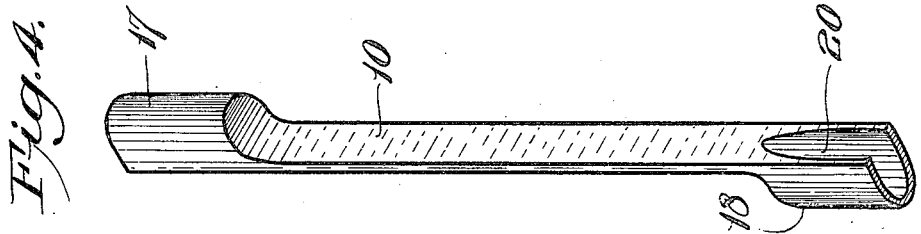
Inventor
Charles N. Koch.
By ...
Attorney Dec. 20, 1927.   1,653,217
C. N. KOCH
COMBUSTION TURBINE
Filed Feb. 3, 1923   6 Sheets-Sheet 4
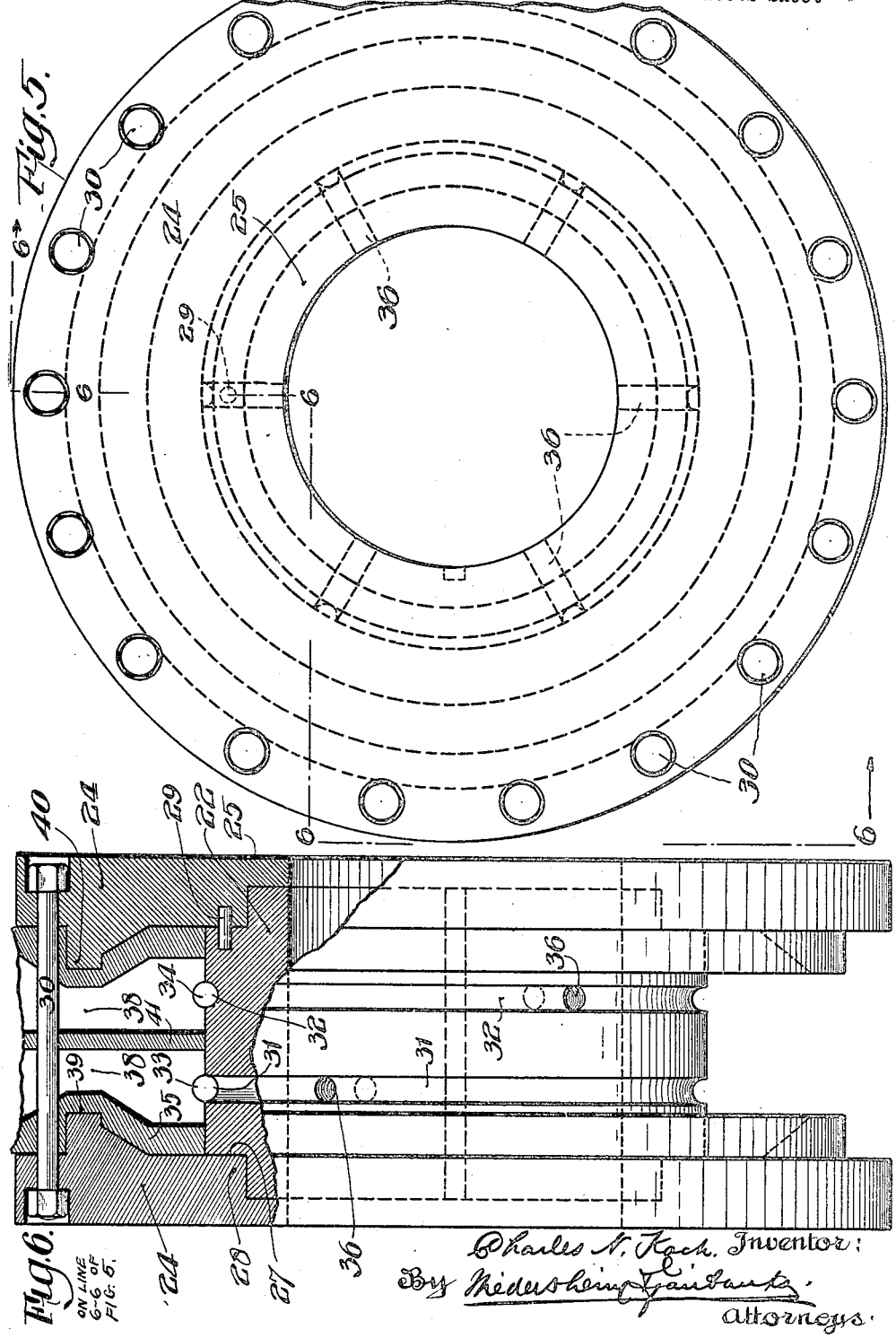

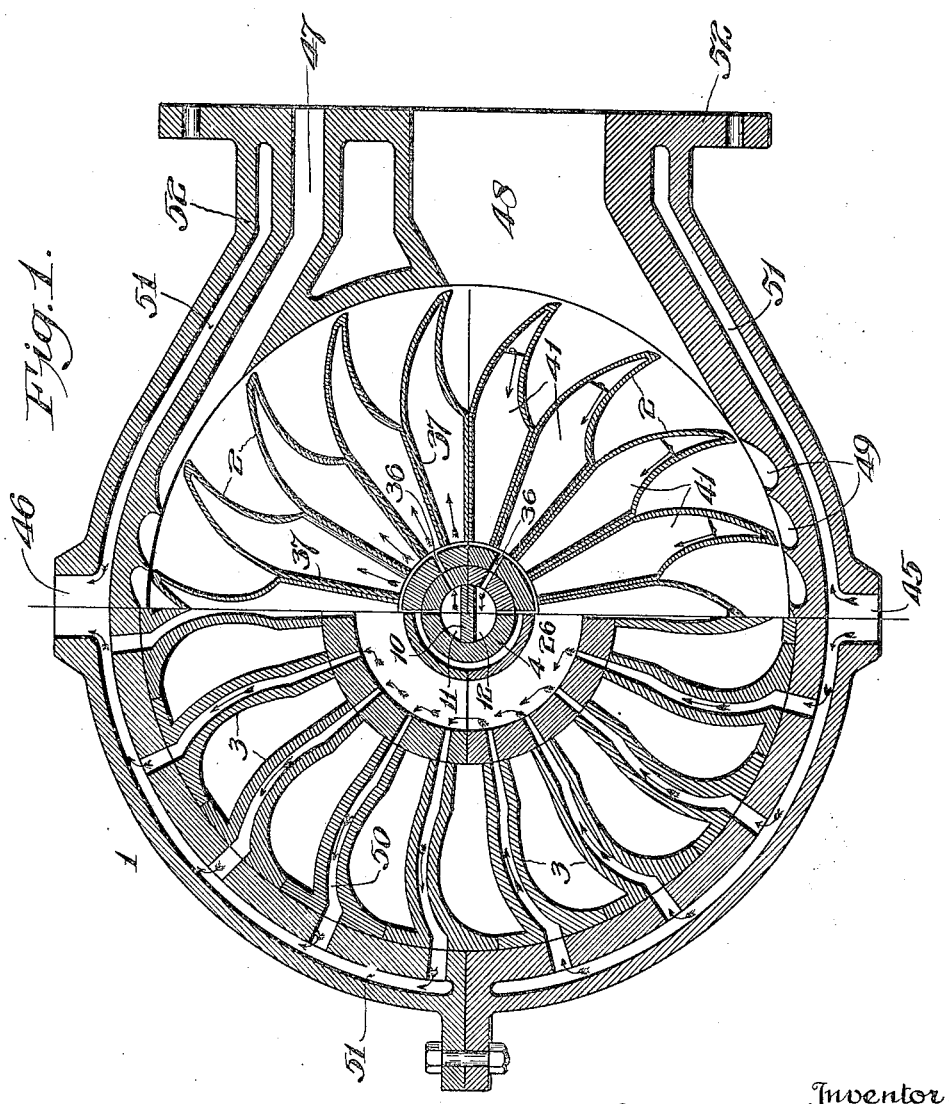

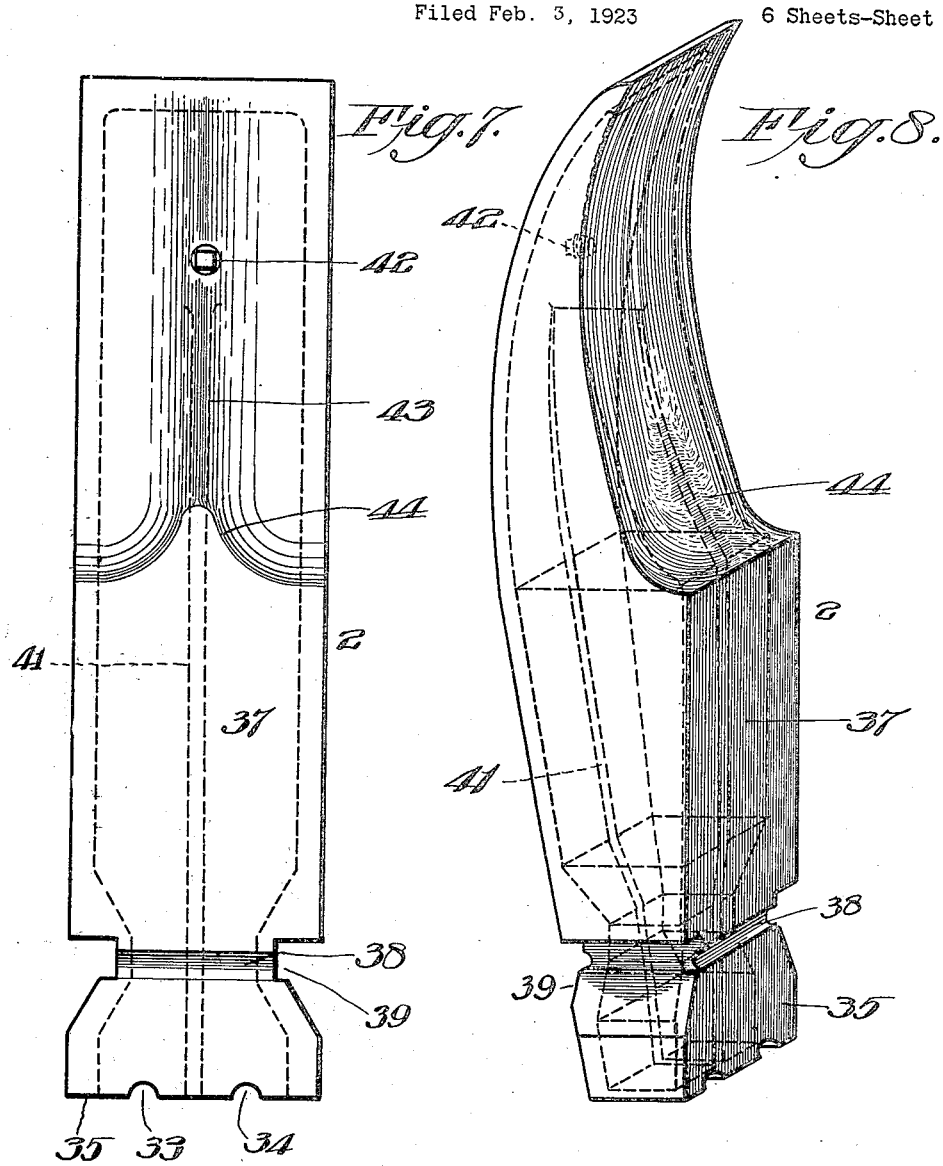

Dec. 20, 1927.
C. N. KOCH
COMBUSTION TURBINE
Filed Feb. 3, 1923
1,653,217
6 Sheets-Sheet 6
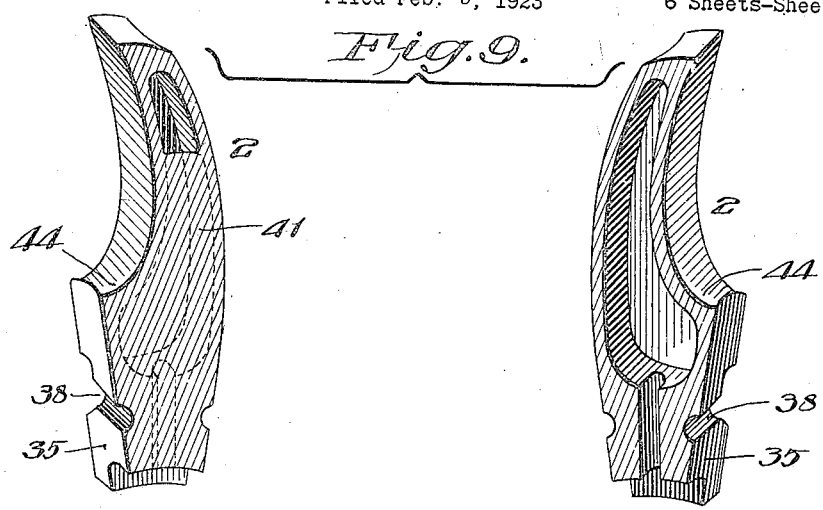
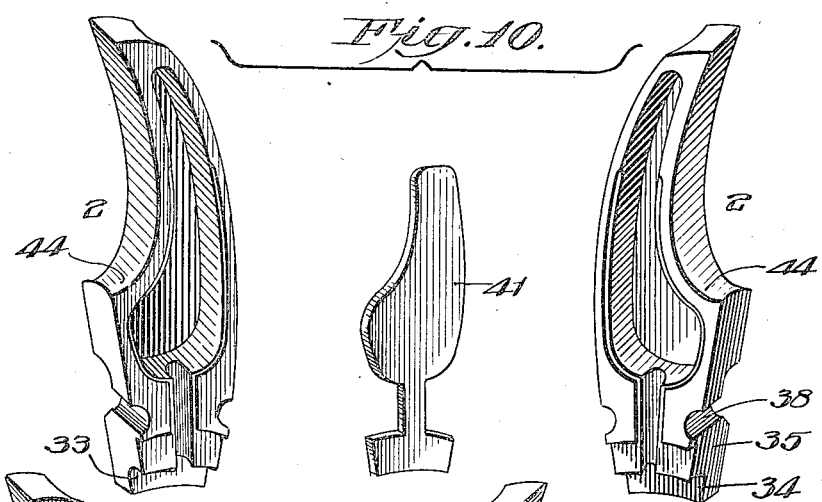
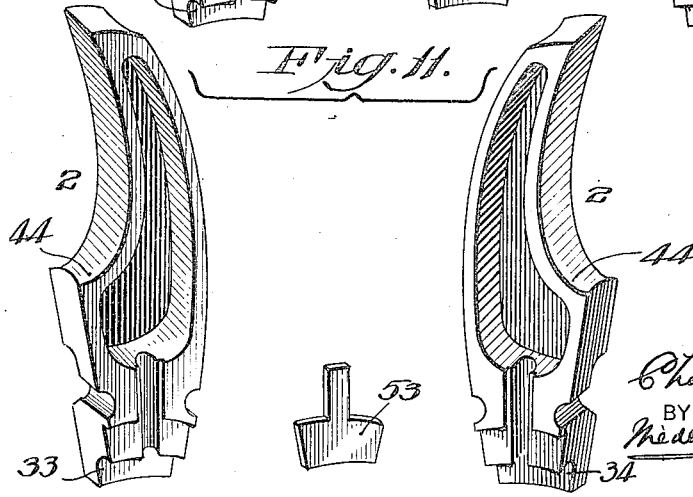
INVENTOR:
Charles N. Koch.
BY
ATTORNEYS.

Patented Dec. 20, 1927.

1,653,217

UNITED STATES PATENT OFFICE.

CHARLES N. KOCH, OF KANE, PENNSYLVANIA.

.COMBUSTION TURBINE.

Application filed February 3, 1923. Serial No. 616,307.

My present invention relates to internal combustion engines of the impact and reactionary impulse turbine type and of the general character set forth in an application for patent filed by me July 14, 1922, as Serial No. 574,877, now pending, and to which reference may be made.

With all of the general objects of the invention of my foregoing application, it is the object of my present invention to improve the means for circulating a cooling medium through the rotor shaft, the hubs, the rotor blades, the stator blades, and the casing of an internal combustion turbine or other engine of similar construction, in which the rotor blades, the stator blades and their adjuncts are subjected to high temperatures.

Further objects are to improve the design and shape of the rotor blades, to provide effective means for assembling and securing the parts together and for the cleaning of the channels for the cooling medium, and, in general, for simplifying and rendering less expensive and more durable and effective the construction and mode of operation of the entire engine.

With the foregoing and other objects in view, my invention comprehends such a construction of an internal combustion engine of the impact and reactionary impulse turbine type as is hereinafter described and typically illustrated in the accompanying drawings,—the particular features which I claim as novel being set forth in the appended claims.

It is to be understood, of course, that the typical embodiment of my invention set forth in the accompanying drawings which is that at present preferred by me because in practice it will be found to give satisfactory and reliable results, as well as the various specific instrumentalities illustrated and herein described, may be modified in proportions, dimensions, and minor details without departing from the spirit or scope of my invention or sacrificing any of its advantages.

Figure 1 represents a transverse section through the assembled turbine,—the left hand part being taken through the stator blading, shrouding and casing, and the arrows indicating the direction of the flow of the cooling medium. The right hand part is taken through the rotor blading, the hub, shaft and shaft baffle,—the arrows showing the direction of the flow of the cooling medium as it enters and leaves the rotor blading.

Figure 2 represents in central, longitudinal section the assembled turbine, illustrating the shaft, shaft baffle, hubs, clamping collars, rotor blades, stator blades, casing, worm gearing, swivel admission union, discharge ports and chamber, cooling discharge receptacle and shaft bearings. In this figure the arrows indicate the flow of the cooling medium from the intake through the shaft, shaft hubs, rotor blades, shaft hubs, shaft and discharge receptacle.

Figure 3 represents a view similar to Figure 2 with the casing and its adjuncts, the stator blades, the shaft bearings, the worm gearing and the discharge receptacle all removed.

This view also indicates by the arrows the flow of the cooling medium through the shaft and the rotor blades.

Figure 4 represents a perspective of the shaft baffle removed from the shaft.

Figure 5 represents an end elevation of one of the clamping collars, showing also in dotted lines a rotor blade hub, as shown in Figure 6.

Figure 6 represents partly in side elevation and partly in fragmentary central section on the line 6—6 of Figure 5, a rotor hub, the clamping collars and the basal portion of a rotor blade. These views also illustrate the method of securing the rotor blades to the hub and the annular grooves by which the cooling medium passes from one of the chambers of the shaft to the rotor blades and having passed through them, returns to the other chamber of the shaft.

Figure 7 represents a rear elevation of one of the rotor blades removed from the shaft, illustrating by the shading the reinforcement, and by dotted lines the hollow cooling space within the blade and a type of diaphragm which extends almost from tip to base of the blade and directs the flow of the cooling medium in both directions. This view also shows the V-shaped boss which separates and directs the flow of gases to the stator blades.

Figure 8 represents a perspective of the rotor blade illustrated in Figure 7, the dotted lines and shading being to the compass which the perspective permits.

Both Figures 7 and 8 illustrate a plug tapped into the back of the blade to permit of cleaning and inspecting the internal space and channels through which the cooling medium passes. They also show the base of the blade and the method of attaching it to the hub.

Figures 9, 10 and 11 represent perspective details of a modified construction of a rotor blade and a diaphragm differing from that illustrated in Figures 7 and 8.

Similar numerals of reference indicate corresponding parts.

Referring to the drawings:

Referring first to Figures 1, 2, 3 and 4 of the drawings, 1 designates a typical turbine casing of such dimensions as to have mounted within it a desired plurality of rotor blades 2 and a corresponding plurality of stator blades 3 of a construction hereinafter described.

4 designates a hollow shaft extending axially through the casing and mounted for rotary movement in bearings 5 and 6 of any preferred construction.

7 designates a worm or similar gearing by means of which the desired rotation is imparted to the shaft which operates the charging device and auxiliaries such as cooling medium pump, fuel pump, lubricating pump, air compressors, electric generator, and valve mechanism for the admission of fuel and air.

8 designates an intake pipe for the cooling medium, fixedly connected with the shaft, preferably by a swivel intake union 9.

10 designates a baffle plate, see Figure 4, fitted within and extending longitudinally of the shaft so as to divide its hollow interior into two shaft chambers 11 and 12, which extend from the intake end of the shaft to a discharge chamber 13, at the other end, radial ports 14 from which lead into a discharge receptacle 15 surrounding the shaft and having an outlet 16 which permits of the ultimate discharge of the cooling medium.

The baffle plate 10, see Figure 4, is essentially a flat plate to the body portion of which the numeral 10 is applied, and which, at its ends, is formed with oppositely-disposed, elongated, semi-cylindrical centering surfaces 17 and 18, radially correspondent with the radii of the hollow interior of the shaft, and which, therefore, as will be understood from Figures 1, 2 and 3, position the baffle plate centrally of said hollow interior of the shaft.

A key 19 locks the baffle plate within the shaft.

20 and 21 are conical channels respectively formed within the centering surfaces 17 and 18, and which serve, respectively to distribute the inflow of the cooling medium from the intake pipe within one of the shaft chambers, and to assist in the distribution or outflow of said medium into the discharge chamber 13 and discharge receptacle 15.

Inasmuch as the stator blades except in combination with the casing and the rotor blades, form no specific feature of my present invention,—I will now describe the rotor blades, their special construction and their mode of attachment to the shaft.

The rotor blades themselves are in Figures 7 and 8 represented as detached from the shaft and casing, and their mode of attachment will be best understood from Figures 2, 5 and 6.

The rotor blades, as is usual in these engines, are as to the front and rear faces of their basal portions in contact with each other, see Figure 1,—and their length when calculated in connection with their hubs and clamping collars, is such that they extend from the inner circumference of the casing to the exterior circumference of the hub's shaft by the rotation of which they are driven.

The rotor hubs 22 and 23 are ported and recessed collars, as shown in Figures 3, 5 and 6, are adapted to be keyed upon the shaft before the rotor is assembled in the casing. 24 designates the rotor blade clamping collars which form a fluid tight joint with the hubs at 27 and are secured in position by the pin 29 and clamping device 30, see Figure 6.

A pair of semi-cylindrical grooves 31 and 32 externally encompass the hubs, and match and are adapted to register with pairs of internally extending semi-circular grooves 33 and 34 which extend transversely across the basal member 35 of each rotor blade, so that continuous cooling medium channels completely surround the exterior of the hubs and the bases of the rotor blades to permit of the admission and discharge of the cooling medium from and into the shaft chambers into and from the rotor blades.

The cooling medium is admitted into and discharges from these circumferential grooves 31—33 and 32—34 by and through radial ports 36 leading out from and into the shaft chambers 11 and 12, respectively.

To secure the effectual placement and gripping of the rotor blades between the clamping collars and their contact with each other and with their hubs, I taper in the lower portions of the rotor blades from about the middle of their length downwardly front and back, to give them from an end view as in Figure 1, correspondingly-inclined opposing contact faces 37, and shape their basal portions as shown in Figure 6, to form a narrow internal throat 38, externally on each side formed with a lug or grooved recess 39, into which fits a lug 40 formed one on an inner face of each of the clamping collars 24.

Of course this precise geometric formation as illustrated in the drawings and above described, while a good form, is not the only form that may be resorted to, as obviously, the two inner faces of each pair of clamping collars, and the opposing outer faces of each of the basal portions of each of the rotor blades, may be structurally modified, so long at least as they shall remain counterpart opposites, and this for the reason that the retention of the clamping position against the blades and hubs will be more or less effectually secured by the connecting bolts 30.

As a preferential construction each rotor blade may be longitudinally divided lengthwise of its hollow interior by a diaphragm 41, extending from the base of each blade to near its top, and in consequence, a construction assuring a constant circulation of the cooling medium within and throughout the interior of the blade.

As illustrated in Figures 9, 10 and 11, a construction of the rotor blades is shown in which each blade is made of two counterpart opposite hollow castings with a short diaphragm 53 adapted to be enclosed and retained between the parts when the two parts are united.

42 designates plugs tapped into the back of the rotor blades to permit of the cleaning of the spaces within said blades for the cooling medium.

Referring to Figures 7 and 8, 43 designates a bulge formation on the upper back curved surface of the rotor blades, which considered in connection with a V-shaped boss 44 on the opposite face formation, subserves the purpose of separating and directing the flow of the gases against the side faces of the stator blades.

The stator blades 3 being of any preferred character, and, if desired, of that of the construction employed in my co-pending application referred to, require no special description, as a reference to the illustrations, particularly of Figures 1 and 2, will indicate the direction of the flow of the cooling medium through them.

In Fig. 1, 45 is the cooling medium inlet and 46 is the cooling medium outlet. The explosive gases enter through inlet 48, pass along the working surface 44 of the rotor blades, thence onto stator blades and outward passing onto the rotor blades again via the pockets or passageways 49 in the internal circumference of the casing.

The water channels 50 through the stator blades and the water chamber 51 in the casing, will be understood by reference to said Figure 1, in which also a preferred mounting of the casing through a flanged extension 52 is also illustrated.

It will now be understood that in the operation of my turbine the cooling medium is introduced into the shaft and the rotor blades under pressure, the centrifugal force of these blades augmenting the equal distribution of the medium throughout the passages and channels in the rotor blades, and that as these rotor blades come also into contact with the highly heated gases, the cooling medium within them will absorb a portion of the heat, and by thermosiphonic action greatly facilitate the circulation.

Except in so far as the subject is set forth in my co-pending application, my present invention, in its broad aspects, comprehends the cooling of all of the hollow blades regardless of their shape, design or size, and without regard to whether or not a diaphragm of a given length is inserted in them, in order that the flow of the cooling medium within them may be in opposing parallel directions.

The type of motor which forms the subject of this application is adapted to utilize either light or heavy fuel and of either a solid liquid or gaseous nature.

Having thus described my invention what I claim as new and desire to secure by Letters Patent, is:—

1. In an internal combustion turbine, a casing embodying channels or passage ways for a cooling medium and other channels or passage ways for an explosive medium,—a hollow, rotatable shaft passing axially through said casing and divided longitudinally into two chambers by a longitudinally-extending baffle plate,—an inlet for a cooling medium at one end of the shaft leading into one of the shaft chambers,—an outlet for said cooling medium at the other end of the shaft leading from the other of said shaft chambers,—a plurality of hollow rotor blades fixed to and rotatable with the shaft,—a corresponding plurality of stator blades fixed to the casing, and intervening the rotor blades,—and channels for the cooling medium leading from one of the shaft chambers into the rotor blades and leading out from said rotor blades into the other of said shaft chambers and thence to the shaft outlet.

2. In an internal combustion turbine, a casing embodying channels or passage ways for a cooling medium and other channels or passage ways for an explosive medium,—a hollow, rotatable shaft passing axially through said casing and divided longitudinally into two chambers by a longitudinally-extending baffle plate,—an inlet for a cooling medium at one end of the shaft leading into one of the shaft chambers,—an outlet for said cooling medium at the other end of the shaft leading from the other of said shaft chambers,—a plurality of hollow rotor blades fixed to and rotatable with the shaft,—a corresponding plurality of stator blades fixed to the casing and intervening the rotor blades,—and pairs of parallel channels encompassing the hubs, through which radial hub apertures open, and which in the rotation of the blades are adapted to register with radial apertures through the walls of the shaft, whereby the cooling medium is caused to pass through the hollow interiors of all of the rotor blades, first from the inlet shaft chamber and thereafter into the outlet shaft chamber and thence to the shaft outlet.

3. In an internal combustion turbine, a casing embodying channels or passage ways for a cooling medium and other channels or passageways for an explosive medium,—a hollow, rotatable shaft passing axially through said casing and divided longitudinally into two chambers by a longitudinally-extending baffle plate,—an inlet for a cooling medium at one end of the shaft leading into one of the shaft chambers,—an outlet for said cooling medium at the other end of the shaft leading from the other of said shaft chambers,—a plurality of rotor blades the interiors of which are hollow throughout their lengths from an enlarged opening at their basal portions to a contracted closure at their tops, and which are fixed to and rotatable with the shaft,—and channels for the cooling medium leading from one of the shaft chambers into the hollow interiors of the rotor blades and leading out from said rotor blades into the other of said shaft chambers and thence to the shaft outlet.

4. In an internal combustion turbine, a casing embodying channels or passage ways for a cooling medium and other channels or passage ways for an explosive medium,—a hollow, rotatable shaft passing axially through said casing and divided longitudinally into two chambers by a longitudinally-extending baffle plate,—an inlet for a cooling medium at one end of the shaft leading into one of the shaft chambers,—an outlet for said cooling medium at the other end of the shaft leading from the other of said shaft chambers,—and a plurality of rotor blades the interiors of which are hollow throughout their lengths from an enlarged opening at their basal portions to a contracted closure at their tops, and the hollow interiors of which are divided so as to form an ingoing passage way and an outgoing passage way for the cooling medium.

5. A turbine rotor blade having a diaphragm forming chambers communicating at the tip of the blade and having at its basal passage an inlet passage communicating with one of said chambers and a discharge passage communicating with the other of said chambers, in combination with a hub having passages communicating with said blade passages, and a hollow shaft having a diaphragm dividing it into an inlet and an outlet passage for a cooling medium, said inlet passages communicating with the inlet passage of a blade and said outlet passages communicating with the discharge passage of a blade.

6. A turbine rotor having a hub, with inlet and discharge passages through it, turbine rotor blades secured on said hub and having a curved working face against which the motive fluid impacts, said rotor blades being hollow and having diaphragms separating them into inlet and discharge chambers communicating with each other near the tip of the blade and communicating with the inlet and discharge passages of said hub, a hollow shaft having a baffle dividing it into an inlet passage and a discharge passage, said inlet passage being in communication with the inlet passages in said hub, and said discharge passage being in communication with the discharge passage of said hub, and means to introduce cooling medium into said shaft inlet passage.

CHARLES N. KOCH.